United States Patent [19]

Takeuchi et al.

[11] Patent Number: 4,807,050

[45] Date of Patent: Feb. 21, 1989

[54] VIDEO SIGNAL RECORDING/REPRODUCING APPARATUS

[75] Inventors: Akihiro Takeuchi, Ikoma; Masaaki Kobayashi, Kawanishi; Kazuhiro Yamanishi, Kashiwara; Atsuo Ochi, Kadoma, all of Japan

[73] Assignee: Matsushita Electric Industrial Co., Ltd., Osaka, Japan

[21] Appl. No.: 948,143

[22] Filed: Dec. 29, 1986

[30] Foreign Application Priority Data

Dec. 26, 1985 [JP] Japan .................................. 60-293820

[51] Int. Cl.$^4$ .............................................. H04N 9/79
[52] U.S. Cl. ....................................... 358/328; 358/31; 360/33.1
[58] Field of Search ...................... 356/327, 34, 14, 31, 356/330, 328; 360/33.1, 19.1, 10.3

[56] References Cited

U.S. PATENT DOCUMENTS

| | | | |
|---|---|---|---|
| 4,117,509 | 9/1978 | de Boer | 358/14 |
| 4,179,705 | 12/1979 | Faroudja | 358/31 |
| 4,283,737 | 8/1981 | Nikami | 360/10.3 |
| 4,419,698 | 12/1983 | Shiraishi et al. | 358/330 |
| 4,476,501 | 10/1984 | Hirota et al. | 360/19.1 |
| 4,486,789 | 12/1984 | Hirota et al. | 360/33.1 |
| 4,533,936 | 8/1985 | Tiemann et al. | 358/34 |
| 4,661,842 | 4/1987 | Ishige et al. | 358/31 |
| 4,695,899 | 9/1987 | Nagano et al. | 358/327 |

OTHER PUBLICATIONS

"Broadcasting Technology", vol. 35, No. 10 (Oct. 1982), pp. 872–890.

Primary Examiner—Russell E. Adams
Attorney, Agent, or Firm—Wenderoth, Lind & Ponack

[57] ABSTRACT

A video signal recording/reproducing apparatus has, in a recording signal processing section, a first switching circuit for exchanging 2-channel component signals at intervals of nH (n: any integer, H: horizontal scanning period) to obtain two combined signals each containing the 2-channel component signals which appear alternately at periods of nH, and a first delay circuit for delaying one of the two combined signals by nH so that the same kind of signals appear at same timings in the two combined signals. The two combined signals one of which is delayed by nH will not be interfered with each other by crosstalks therebetween which will occur in the subsequent circuits including recording and reproducing heads. A reproduced signal processing section has a second delay circuit for delaying by nH a reproduced combined signal which corresponds to the combined signal which has not been delayed in the recording signal processing section so as to recover the original timing relation between reproduced two combined signals, and a second switching circuit for exchanging the reproduced two combined signals one of which is delayed by nH by the second delay circuit at intervals of nH to obtain the original 2-channel component signals.

9 Claims, 5 Drawing Sheets

VIDEO SIGNAL RECORDING/REPRODUCING APPARATUS

BACKGROUND OF THE INVENTION

1. Field of the Invention

This invention relates to a video signal recording/reproducing apparatus for recording video signals on a recording medium such as a magnetic tape and reproducing the recorded video signals, and more particularly to a video signal recording/reproducing apparatus for recording and reproducing video signals separated into 2-channel component signals.

2. Description of the Prior Art

The so-called 2-channel component video cassette recorders (VCRs) for industrial or broadcasting use have been known such as M-format VCRs and βCAM VCRs, which are shown in, for example, the Japanese technical magazine "Broadcasting Technology", Vol. 35, No. 10 (October 1982), pp. 872–890. The 2-channel component VCR records on a magnetic tape 2-channel component signals separated from a video signal, and reproduces the recorded signals from the magnetic tape. The 2-channel component signals are generally a luminance signal and a chrominance signal (which is composed, for example, of time-base compressed two chrominance difference signals).

The 2-channel component signals are respectively subjected to frequency-modulations to be converted to frequency-modulated (FM) luminance and chrominance signals. The FM luminance and chrominance signals are respectively amplified and recorded on a magnetic tape via luminance and chrominance signal recording heads. The recorded FM luminance and chrominance signals are respectively reproduced from the magnetic tape via luminance and chrominance signal reproducing heads (which are usually the same as the recording heads), amplified, and subjected to frequency-demodulations to be reconverted to the original 2-channel component signals.

The 2-channel component VCR has such a problem that crosstalk will occur between the FM luminance and chrominance signals, especially at the high-gain recording and reproduced signal amplifiers, the rotary transformers and the magnetic heads. The crosstalk appears as beats in the reproduced picture on the display screen, resulting in degradation of the reproduced picture.

Conventional methods to solve this problem are (1) to provide short-circuit rings between each adjacent two rotary transformers and (2) to dispose the adjacent magnetic heads to be apart by 3–5 mm from each other. However, the above method 1) increases cost because the number of slots of the rotary transformers increases. The above method (2) reduces the recording density because the video tracks are apart by 3–5 mm from each other, and also reduces the correlation of time-base error between the two channels. Another conventional method to shield the magnetic heads also increases cost.

SUMMARY OF THE INVENTION

Therefore, an object of the present invention is to effectively reduce the crosstalk between the two channels thereby to improve the reproduced picture quality in a simple configuration and at a low cost in a video signal recording/reproducing apparatus treating the 2-channel component signals.

The present invention provides, in the recording signal processing section of a video signal recording/reproducing apparatus: a first switching circuit for exchanging first and second channel component signals, either before or after frequency-modulation, at intervals of nH (n: any integer, H: horizontal scanning period) to obtain first and second combined signals each containing the first and second channel component signals which appear alternately at periods of nH, and a first delay circuit for delaying one of the first and second combined signals by nH period so that same channel component signals contained in the first and second combined signals will pass recording signal amplifiers, rotary transformers and recording heads at same timings respectively. Since the same kind of signals will hardly be interfered by the crosstalks therebetween, the two combined signals one of which is delayed from the other by nH period will hardly interfere with each other, thereby remarkably reducing the interference due to the crosstalks therebetween. Apparently, during reproduction, the reproduced two combined signals will hardly interfere with each other at reproducing heads, the rotary transformers and reproduced signal amplifiers. The reproduced signal processing section of the video signal recording/reproducing apparatus of the invention is provided with: a second delay circuit for delaying the other (which has not been delayed in the recording signal processing section) of the reproduced two combined signals, either before or after frequency-demodulation, by nH period so that the two combined signals recover in the original phase relation; and a second switching circuit for exchanging the two combined signals, either before or after frequency-demodulation, at intervals of nH so as to obtain two channel component signals equivalent to the original first and second channel component signals.

The above object and features of the present invention will become more apparent from the following description taken in connection with the preferred embodiments and the accompanying drawings in which:

DESCRIPTION OF THE PREFERRED EMBODIMENTS

Figure 1:
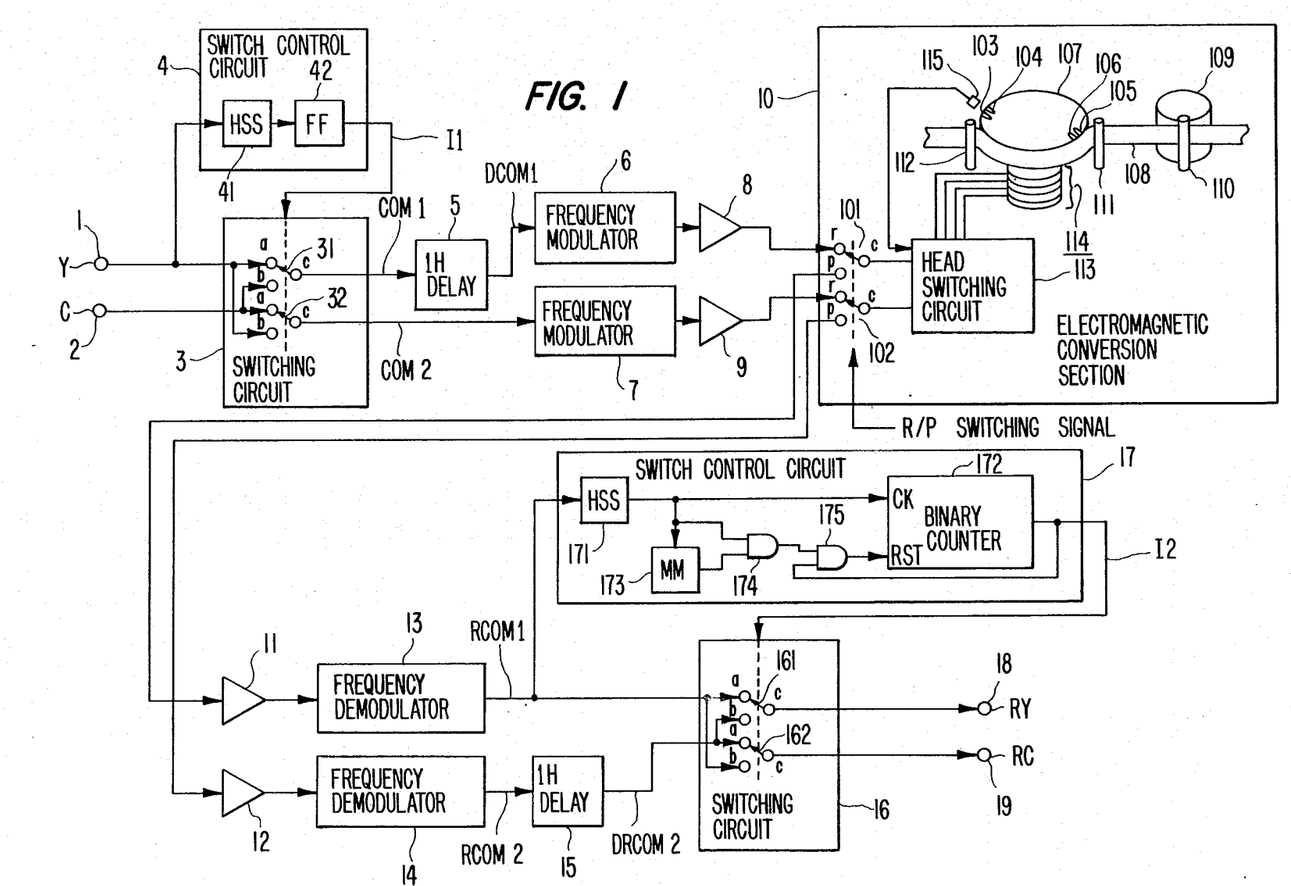
FIG. 1 is a block diagram showing a 2-channel component video cassette recorder as an embodiment of the present invention.

A 2-channel component video cassette recorder embodying the present invention is shown in FIG. 1. Signal timing charts in recording and reproducing (or playback) mode are respectively shown in FIGS. 2 and 3.

Figure 2:
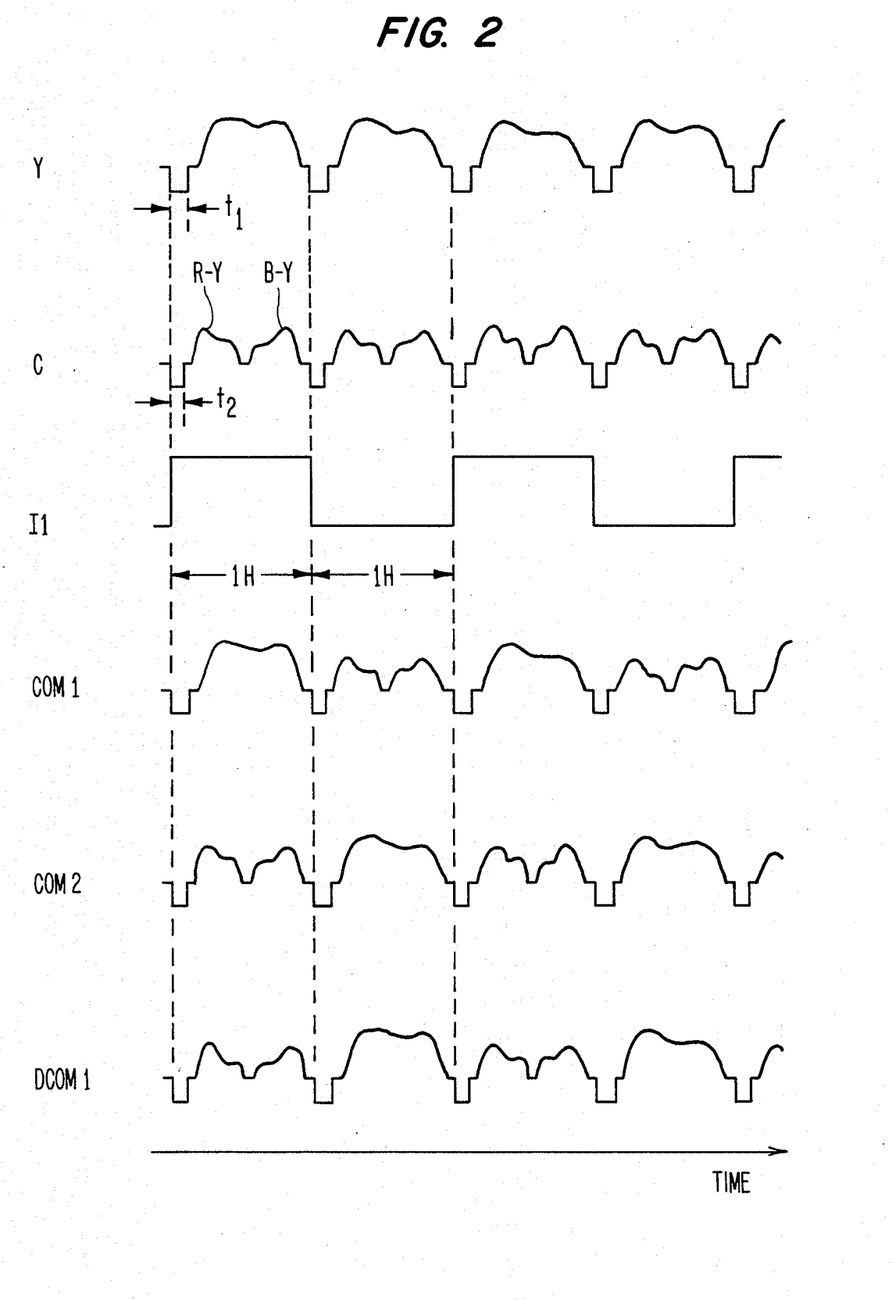
FIG. 2 is a timing chart of signals in a recording mode of the embodiment in FIG. 1.

First and second channel component signal inputted to input terminals 1 and 2 are respectively a luminance signal Y and a chrominance signal C as shown in FIG. 2. The chrominance signal C contains time-base compressed two chrominance difference signals R-Y and B-Y in this embodiment. The duration $t_1$ of each horizontal synchronizing signal (HSYNC signal) of the luminance signal Y is selected longer than the duration $t_2$ of each HSYNC signal of the chrominance signal C, i.e., $t_1 > t_2$.

The luminance and chrominance signals Y and C are exchanged by a switching circuit 3 at intervals of 1H (H: horizontal scanning period) to be converted to two combined signals COM1 and COM2 each of which, as shown in FIG. 2, contains the luminance and chrominance signals Y and C which appear alternately at periods of 1H. The switching circuit 3 comprises two changeover switches 31 and 32 each of which selects its first and second input terminals a and b alternately at intervals of 1H in synchronism with the other in response to a control signal I1 which inverts its state at intervals of 1H as shown in FIG. 2. Since the luminance signal Y is applied to the first input terminal a of the changeover switch 31 and the second input terminal b of the changeover switch 32 and the chrominance signal C is applied to the second input terminal b of the changeover switch 31 and the first input terminal a of the changeover switch 32, the combined signals COM1 and COM2 appear at output terminals c of the changeover switches 31 and 32, respectively.

The control signal I1 is produced from the HSYNC signals of the luminance signal Y by a switch control circuit 4 which comprises a horizontal synchronizing signal separating circuit (HSS circuit) 41 and a flip-flop circuit (FF circuit) 42. The HSS circuit 41 separates the HSYNC signals from the luminance signal Y. The FF circuit 42 inverts its output state in response to the leading edge of each of the HSYNC signals from the HSS circuit 41 thereby producing the control signal I1.

The combined signal COM1 from the changeover switch 31 is delayed by 1H period by a 1H delay circuit 5 to be a delayed combined signal DCOM1 as shown in FIG. 2. Referring to DCOM1 and COM2 in FIG. 2, same kind of signals at same timings in both of the delayed combined signal DCOM1 and the combined signal COM2. More specifically, when the luminance signal (of one horizontal line) is appearing in the combined signal COM2 the luminance signal (of the next horizontal line) is appearing in the delayed combined signal DCOM1, and when the chrominance signal (of one horizontal line) is appearing in the combined signal COM2 the chrominance signal (of the next horizontal line) is appearing in the delayed combined signal DCOM1.

The delayed combined signal DCOM1 is subjected to frequency-modulation by a frequency modulator 6 to be a first frequency-modulated (FM) combined signal, which is amplified by a recording signal amplifier 8 and then applied to an electromagnetic conversion section 10. The combined signal COM2 is subjected to frequency-modulation by a frequency modulator 7 to be a second FM combined signal, which is amplified by a recording signal amplifier 9 and then applied to the electromagnetic conversion section 10. In the first and second FM combined signals amplified by the amplifiers 8 and 9, respectively, the same kind of signals (FM luminance signals or FM chrominance signals) are amplified at same timings. Therefore, the first and second FM combined signals are hardly be interfered with each other by the crosstalk therebetween at the recording signal amplifiers 8 and 9.

The first and second FM combined signals inputted to the electromagnetic conversion section 10 are respectively passed through record/playback (R/P) selection switches 101 and 102 and applied to a head switching circuit 113, where they are distributed in a known manner to magnetic heads 103-106 mounted on a rotary cylinder 107 through rotary transformers 114 mounted on a shaft of the rotary cylinder 107. The magnetic heads 103-106 record the two FM combined signals on a magnetic tape 108 wound on the rotary cylinder 107 by a predetermined angle (for example, 180°). The magnetic heads 103-106 may be disposed in any conventional manner to properly produce video track pattern on the magnetic tape 108. The magnetic tape 108 is driven by a capstan 109 and a pinch roller 110 and guided by guide posts 111 and 112 to travel along a predetermined path in a known manner.

Each of the R/P selection switches 101 connects its output terminal c to its recording terminal r in a recording mode and to its playback terminal p in a reproducing mode in response to a R/P switching signal which is produced by an operation of a REC button (not shown) or a PLAY button (not shown) of the VCR in a known manner. The head switching circuit 113 connects the output terminal c of the R/P selection switch 101 alternately to the magnetic heads 103 and 105 through two of the rotary transformers 114, and the output terminal c of the R/P selection switch 102 alternately to the magnetic heads 104 and 106 through the other two of the rotary transformers 114 in response to a head switching signal produced by a head position detector 115.

Therefore, the first and second FM combined signals are respectively recorded on the magnetic tape 108 via the magnetic heads 103 and 104 at a same timing, and via the magnetic heads 105 and 106 at another same timing. Since the magnetic heads 103 and 104 are disposed close to each other and the magnetic heads 105 and 106 are disposed close to each other, the crosstalk occurs between the first and second FM combined signals at the magnetic heads 103 and 104 and at the magnetic heads 105 and 106. The crosstalk also occurs at the rotary transformers 114. However, since the two FM combined signals contain the same kind of FM component signals which appear at same timings, the crosstalk at the magnetic heads or the rotary transformers will hardly cause mutual interference between the two FM combined signals.

In a reproducing mode, the recorded two FM combined signals are reproduced by the magnetic heads 103-106, and passed through the rotary transformers 114, the head switching circuit 113 and the R/P selection switches 101 and 102, to be outputted from the electromagnetic conversion section 10. At this time, it is needless to mention that the reproduced two FM combined signals will hardly be interfered with each other by the crosstalk at the magnetic heads or the rotary transformers.

It should be noted that the internal configuration of the electromagnetic conversion section 10 shown in FIG. 9 is merely an example, but any other internal configurations are possible. Further, by properly designing the arrangement of the magnetic heads 103-106 it will be possible to produce a video track pattern in which portions on which same kind of signals are recorded are adjacent to each other in a direction perpendicular to the longitudinal direction of the video tracks, thereby to further reduce the interference by the crosstalk between the signals on each adjacent two video tracks.

Referring back to FIG. 1, the reproduced first and second FM combined signals from the electromagnetic conversion section 10 are respectively amplified by reproduced signal amplifiers 11 and 12. It is needless to mention that the reproduced two FM combined signals are hardly interfered with each other by the crosstalk at the amplifiers 11 and 13.

Figure 3:
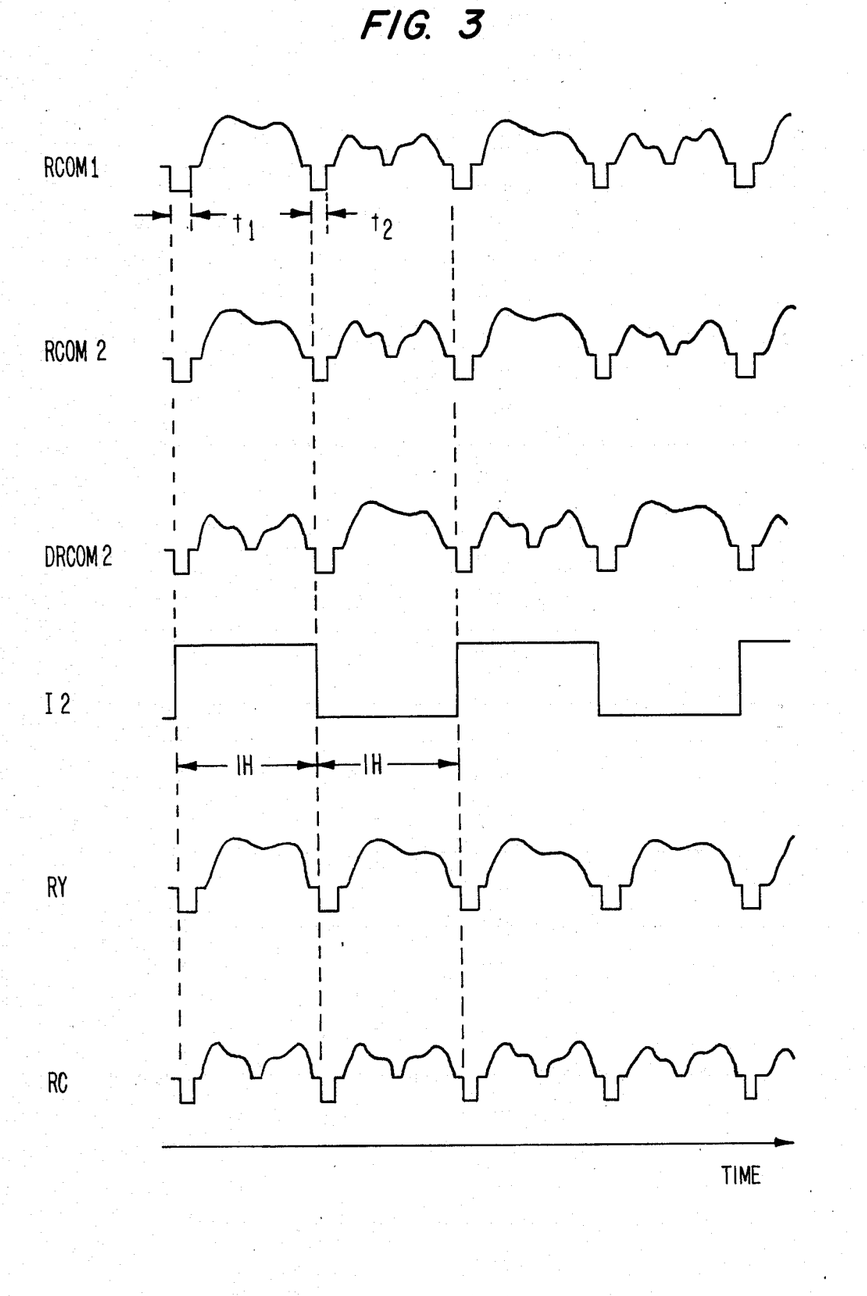
FIG. 3 is a timing chart of signals in a reproducing mode of the embodiment in FIG. 1.

The reproduced first FM combined signal amplified by the amplifier 11 is subjected to frequency-demodulation by a frequency demodulator 13 to be a reproduced first combined signal RCOM1 as shown in FIG. 3, which is equivalent to the original delayed first combined signal DCOM1. The reproduced second FM combined signal amplified by the amplifier 12 is subjected to frequency-demodulation by a frequency demodulator 14 to be a reproduced second combined signal RCOM2 as shown in FIG. 3, which is equivalent to the original second combined signal COM2.

The reproduced second combined signal RCOM2 is delayed by 1H period by a 1H delay circuit 15 to be a delayed reproduced second combined signal DRCOM2 as shown in FIG. 3. As the result, the timing relation between the reproduced first combined signal RCOM1 and the delayed reproduced second combined signal DRCOM2 becomes equal to the timing relation between the original first combined signal COM1 and the original second combined signal COM2.

The reproduced first combined signal RCOM1 and the delayed reproduced second combined signal DRCOM2 are exchanged by a switching circuit 16 at intervals of 1H to a reproduced luminance signal RY and a reproduced chrominance signal RC, which are, as shown in FIG. 3, respectively equivalent to the original luminance and chrominance signals Y and C. The switching circuit 16 comprising two changeover switches 161 and 162 has the same configuration as and operates in the same way as the switching circuit 3 in response to a control signal I2 which, as shown in FIG. 3, inverts its state at intervals of 1H.

The control signal I2 is produced from the reproduced first combined signal RCOM1 by a switch control circuit 17 which comprises a horizontal synchronizing signal separating circuit (HSS circuit) 171, a binary counter 172, a monostable multivibrator circuit (MM circuit) 173, and logical AND gates 174 and 175. The HSS circuit 171 separates the horizontal synchronizing signals (HSYNC signals) from the reproduced first combined signal RCOM1. The HSYNC signals from the HSS circuit 171 are applied to a lock terminal (CK) of the binary counter 172 so that the binary counter 172 inverts its output state in response to every HSYNC signal from the HSS circuit 171, thereby producing the control signal I2. The binary counter 172 may be substituted by a flip-flop circuit. The circuit configured by the MM circuit 173 and the AND gates 174, 174 is to produce a reset signal applied to a reset terminal (RST) of the binary counter 172 when the first coming HSYNC signal in a reproducing mode is a HSYNC signal of the chrominance signal. This operation is necessary for the reproduced luminance and chrominance signals RY and RC to be correctly obtained at output terminals 18 and 19, respectively, of the video cassette recorder. The operations of the switch control circuit 17 and the switching circuit 16 will be explained more in detail below with reference to a signal timing chart shown in FIG. 4.

Each of the changeover switches 161 and 162 connects its output terminal c to its first input terminal a when the control signal I2 is at a high level state, and connects its output terminal c to its second input terminal b when the control signal I2 is at a low level state. Therefore, when the control signal I2 is at the high level state the reproduced first combined signal RCOM1 and the delayed reproduced second combined signal DRCOM2 appear at the output terminals 18 and 19, respectively, and when the control signal I2 is at the low level state the signals RCOM1 and DRCOM2 appear at the output terminals 19 and 18, respectively.

Figure 4:
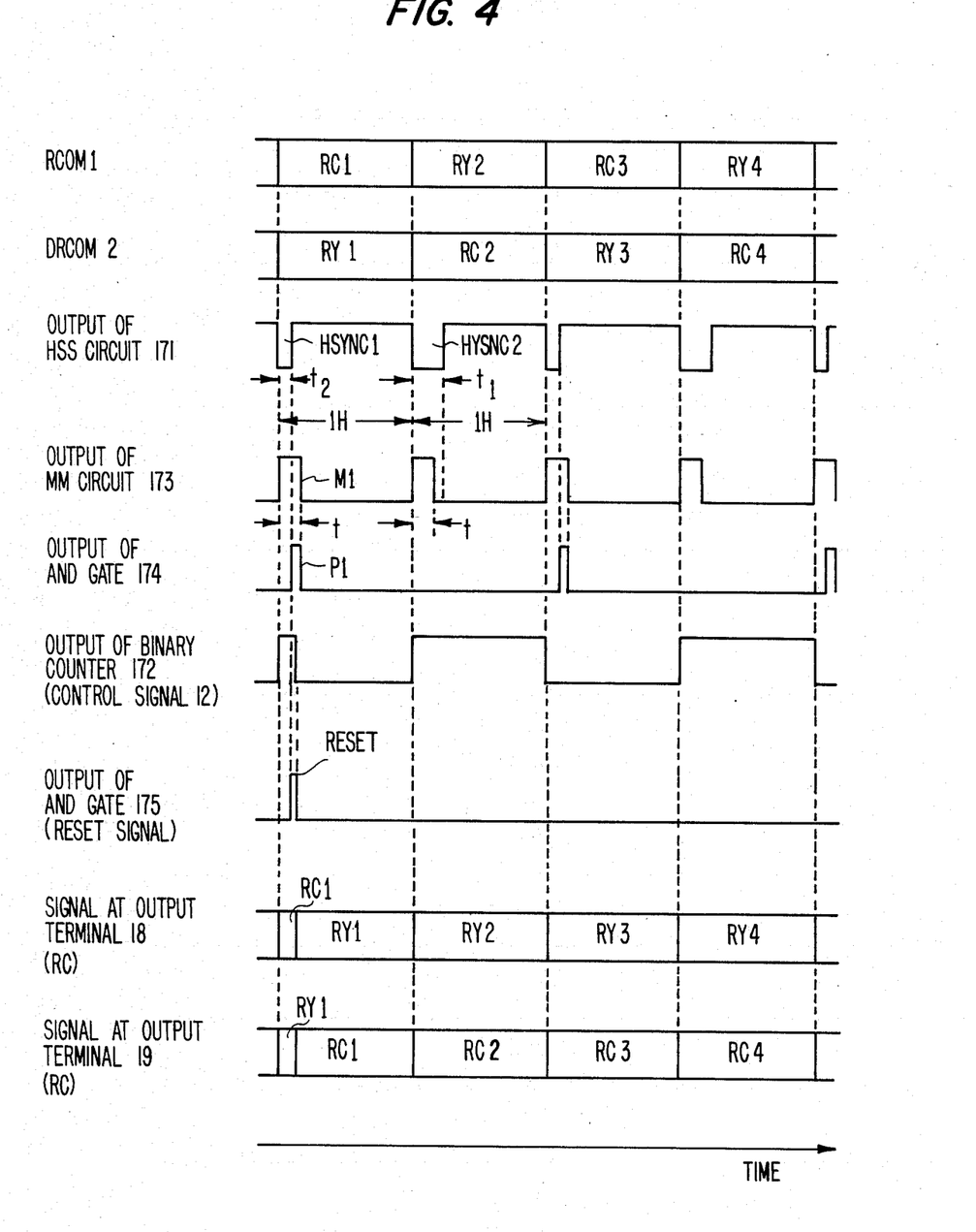
FIG. 4 is a signal timing chart for explaining a switching circuit and a switch control circuit in the reproduced signal processing section of the embodiment in FIG. 1.

Referring to FIG. 4, the signal RCOM1 contains alternately appearing reproduced chrominance and luminance signals in the order of RC1, RY2, RC3, RY4, ... (each number denotes a relative horizontal line number), and the signal DRCOM2 contains alternately appearing reproduced luminance and chrominance signals in the order of RY1, RC2, RY3, RC4, ....

In the HSYNC signals separated from the signal RCOM1 by the HSS circuit 171, the HSYNC signals each having the duration $t_2$ and the HSYNC signals each having the duration $t_1$ ($t_1 > t_2$) appear alternately as shown in FIG. 4. The timing chart of FIG. 4 shows a case in which a reproduced chrominance signal RC1 appears first in the signal RCOM1 in a reproducing mode.

The MM circuit 173 produces a pulse signal having a duration t which is longer than $t_2$ and shorter than $t_1$ ($t_1 > t > t_2$) in response to every HSYNC signal from the HSS circuit 171 as shown in FIG. 4. The AND gate 174 produces a logical AND signal of the output signals from the HSS circuit 171 and the MM circuit 173 as shown in FIG. 4. Since the duration t is selected to be $t_1 > t > t_2$, the AND gate 174 produces a pulse only when each HSYNC signal having the duration $t_2$ (i.e. each HSYNC signal of the chrominance signal) arrives.

When the HSYNC signal HSYNC1 separated from the first coming reproduced chrominance signal RC1 arrives, the MM circuit 173 produces its first pulse signal M1, and the AND gate 174 produces its first pulse P1 after the duration $t_2$ as shown in FIG. 4. On the other hand, the output of the binary counter 172 becomes high in response to the leading edge of the HSYNC1. Since the AND gate 175 is connected to produce a logical AND signal of the output signals from the AND gate 174 and the binary counter 173, a reset pulse RESET is produced by the AND gate 175 after the duration $t_2$ as shown in FIG. 4. The binary counter 173 is reset by the reset pulse, so that its output returns to low.

Next arriving HSYNC signal HSYNC2 is separated from the reproduced luminance signal RY2 and has the duration $t_1$. Thus, the AND gate 174 produces no pulse. The binary counter 173 starts counting in response to the leading edge of the HSYNC2, so that its output becomes high. Since the output of the AND gate 174 remains low, the AND gate 175 produces no reset pulse. Thereafter, as shown in FIG. 4, the condition for producing the reset pulse will not occur, and thus the binary counter 173 continues its normal operation to produce the control signal I2.

In response to the output of the binary counter 173, or the control signal I2, the signal appearing at the output terminal 18 correctly contains the reproduced luminance signals in the order of RY1, RY2, RY3, RY4, ... , and the signal appearing at the output terminal 19 correctly contains the reproduced chrominance signals in the order of RC1, RC2, RC3, RC4, ... , as shown in FIG. 4. The incomplete portion in the first horizontal line of each of the reproduced luminance and chrominance signals RY and RC causes no problems.

Figure 5:
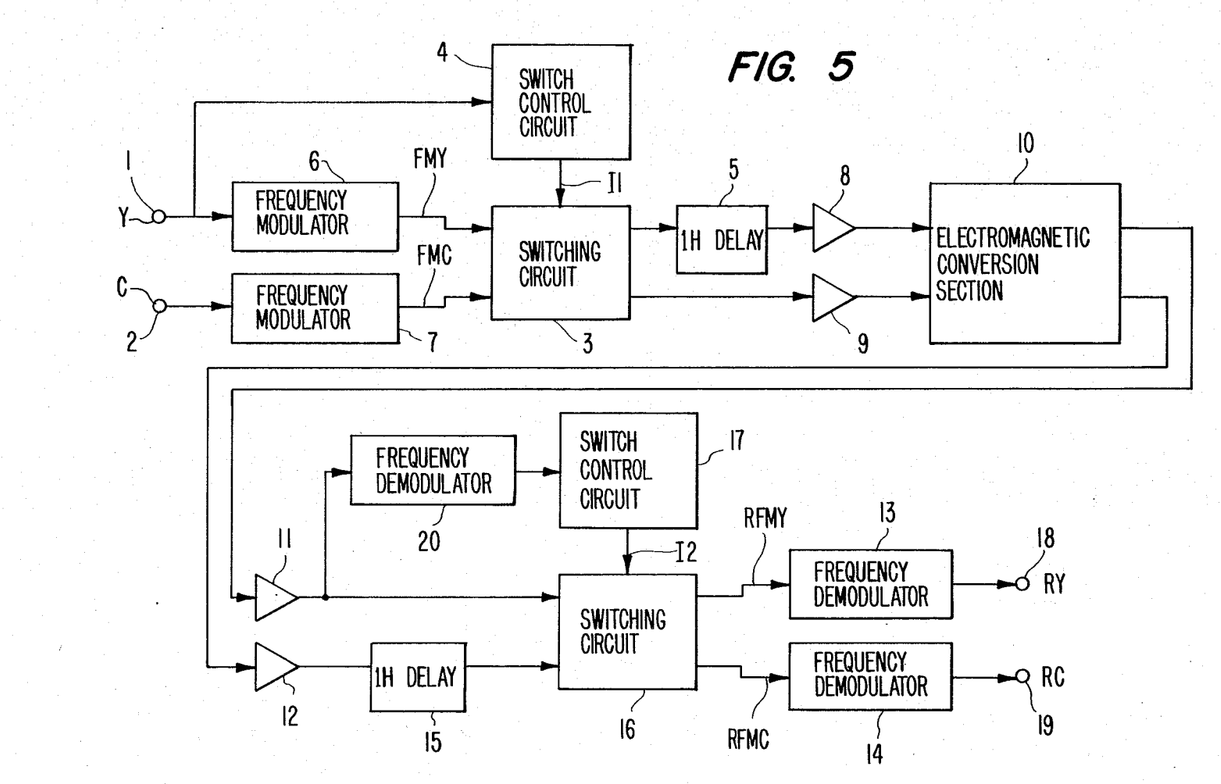
FIG. 5 is a block diagram showing a 2-channel component video cassette recorder as another embodiment of the present invention.

In the embodiment shown in FIG. 1, the frequency modulators 6 and 7 are placed after the switching circuit 3 and the 1H delay circuit 5, and the frequency demodulators 13 and 14 are placed before the 1H delay circuit 15 and the switching circuit 16. But, the frequency modulators 6 and 7 may be placed before the switching circuit 3 and the 1H delay circuit 5, and the frequency demodulators 13 and 14 may be placed after the 1H delay circuit 15 and the switching circuit 16, as shown in FIG. 5. In this case, the switch control circuit 4 produces the control signal I1 from the input luminance signal Y in the same way as in FIG. 1, and the switching circuit 3 exchanges the FM luminance and chrominance signals FMY and FMC at intervals of 1H. The reproduced first combined signal from the amplifier 11 is frequency-demodulated by a frequency demodulator 20, and the switch control circuit 17 produces the control signal I2 from the output signal of the frequency demodulator 20. The reproduced second combined signal from the amplifier 12 is delayed by 1H period by the 1H delay circuit 15. The switching circuit 16 exchanges the reproduced first combined signal from the amplifier 11 and the delayed reproduced second combined signal from the 1H delay circuit 15 at intervals of 1H to obtain the reproduced FM luminance and chrominance signals RFMY and RFMC, which are then frequency-demodulated by the frequency demodulators 13 and 14 to be the reproduced luminance and chrominance signals RY and RC.

The embodiment shown in FIG. 5 is advantageous in that each of the luminance and chrominance signals is processed by the same frequency modulator and the same frequency demodulator, so that it will not be changed in its characteristics by the variations of the performances of the two frequency modulators and the two frequency demodulators.

It should be understood that the above-described embodiments are only for explanation for the present invention to be understood, but various changes and modifications may be made within the scope of the present invention defined in the appended claims.

For example, the signal exchanging interval may not be 1H, but may be nH (n: any integer). In this case, each of the FF circuit 42 and the binary counter 172 is substituted by an n-counter, and each of the 1H delay circuits 5 and 15 is substituted by an nH delay circuit having a delay time of nH.

Further, the internal configuration of each of the switching circuits 3 and 16 and the switch control circuits 4 and 17 may be modified in various manners to achieve the same function as described before. Furthermore, other various circuits ordinarily used in the conventional video recording/reproducing apparatus may be added, such, for example, as the pre-emphasis circuits in the recording signal processing section and the de-emphasis circuits in the reproduced signal processing section.

Moreover, the chrominance signal may not be the signal containing the time-base compressed two chrominance difference signals, but may be any other kind of signal having a chrominance signal information.

Still moreover, the present invention can be applied to any other type of video signal recording/reproducing apparatus which records the 2-channel component signals on a recording medium.

What is claimed is:

1. A video signal recording/reproducing apparatus for recording two-channel component signals of a video signal on a recording medium and reproducing the recorded signals, comprising:
    a first switching means for exchanging a first component signal of said 2-channel component signals and a second component signal of said 2-channel component signals at intervals of nH (n: any integer, H: horizontal scanning period of said video signal) to obtain first and second combined signals each containing said first and second component signals which appear alternately at periods of nH;
    a first delay means for delaying said first combined signal by nH to obtain a delayed first combined signal;
    a recording signal processing means for converting said delayed first combined signal and said second combined signal to first and second recordable signals, respectively;
    a recording and reproducing means for recording said first and second recordable signals on said recording medium and reproducing the recorded first and second recordable signals from said recording medium;
    a reproduced signal processing means for converting said first and second recordable signals reproduced from said recording medium to said delayed first combined signal and said second combined signal, respectively;
    a second delay means for delaying said second combined signal from said reproduced signal processing means by nH to obtain a delayed second combined signal; and
    a second switching means for exchanging said delayed first combined signal from said reproduced signal processing means and said delayed second combined signal at intervals of nH to obtain said first and second component signals.

2. The apparatus according to claim 1, wherein said first and second component signals are a luminance signal and a chrominance signal of said video signal.

3. The apparatus according to claim 1, wherein said first switching means comprises a switching circuit for exchanging said first and second component signals at intervals of nH in response to a control signal which inverts its state at intervals of nH, and a switch control circuit for separating horizontal synchronizing signals from one of said first and second component signals and producing said control signal from said horizontal synchronizing signals.

4. The apparatus according to claim 1, wherein said second switching means comprises a switching circuit for exchanging said reproduced delayed first and second combined signals at intervals of nH in response to a control signal which inverts its state at intervals of nH, and a switch control circuit for separately horizontal synchronizing signals from one of said reproduced delayed first and second combined signals and producing said control signal from said horizontal synchronizing signals.

5. The apparatus according to claim 4, wherein said switch control circuit has a circuit for controlling the timing of said control signal so that said first and second component signals are respectively obtained at desired output terminals of said switching circuit.

6. The apparatus according to claim 1, wherein said recording signal processing means comprises first and second frequency modulators for respectively converting said delayed first combined signal and said second combined signal to first and second frequency-modulated signals as said first and second recordable signals.

7. The apparatus according to claim 7, wherein said reproduced signal processing means comprises first and second frequency demodulators for respectively converting said first and second frequency-modulated signals reproduced from said recording medium to said delayed first combined signal and said second combined signal.

8. A video signal recording/reproducing apparatus for recording 2-channel component signals of a video signal on a recording medium and reproducing the recorded signals, comprising:
- a first frequency modulator for converting a first component signal of said 2-channel component signals to a frequency-modulated first component signal;
- a second frequency modulator for converting a second component signal of said 2-channel component signals to a frequency-modulated second component signal;
- a first switching means for exchanging said frequency-modulated first and second component signals at intervals of nH (n: any integer, H: horizontal scanning period of said video signal) to obtain first and second combined signals each containing said frequency-modulated first and second component signals which appear alternately at periods of nH;
- a first delay means for delaying said first combined signal by nH to obtain a delayed first combined signal;
- a recording and reproducing means for recording said delayed first combined signal and said second combined signal on said recording medium and reproducing the recorded delayed first combined signal and second combined signal from said recording medium;
- a second delay means for delaying said second combined signal reproduced from said recording medium by nH to obtain a delayed second combined signal;
- a second switching means for exchanging said delayed first combined signal reproduced from said recording medium and said delayed second combined signal at intervals of nH to obtain said frequency-modulated first and second component signals;
- a first frequency demodulator for converting said frequency-modulated first component signal from said second switching means to said first component signal; and
- a second frequency demodulator for converting said frequency-modulated second component signal from said second switching means to said second component signal.

9. The apparatus according to claim 8, wherein said first and second component signals are a luminance signal and a chrominance signal.

* * * * *